United States Patent
Wang et al.

(10) Patent No.: US 6,401,776 B1
(45) Date of Patent: Jun. 11, 2002

(54) THERMOPLASTIC ELASTOMERS AND METHOD OF MAKING THE SAME

(75) Inventors: Xiaorong Wang, Hudson; Victor J. Foltz, Akron; James E. Hall, Mogadore, all of OH (US)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 09/929,406

(22) Filed: Aug. 14, 2001

(51) Int. Cl.$^7$ .............................. B60C 1/00; C08L 35/00
(52) U.S. Cl. ........................ 152/511; 525/192; 525/194; 525/197; 525/205; 152/510; 152/548
(58) Field of Search ................................ 525/192, 194, 525/197, 205; 152/548, 511

(56) References Cited

U.S. PATENT DOCUMENTS 5,663,234 A    9/1997  Kennedy et al. ............. 525/123
6,133,354 A *  10/2000 Wang et al. ................. 524/268

OTHER PUBLICATIONS

"Free–Radical Polymerization of Complexed Monomers III" by Gaylord et al., J. Poly. Sci., Part. B, 7, pp. 145–152 (1969).

"Preparation of Styrene–Acrylonitrile Alternating Copolymers in the Presence of Zinc Chloride" by Gaylord et al., Macromolecules, 2, pp. 442–447 (1969).

"Butyl and Halogutyl Rubbers", by Fusco et al., Rubber Technology, Chapter 10, (1981).

"Poly(styrene–co–N–maleimide) Copolymer: Preparation by Reactive Extrusion, Molecular Characterization by FTIR, and Use in Blends" by Vermeesch et al. Macromolecules, 26, pp. 6643–6649 (1993).

* cited by examiner

*Primary Examiner*—Ana Woodward
(74) *Attorney, Agent, or Firm*—David G. Burleson; Arthur M. Reginelli

(57) ABSTRACT

A thermoplastic elastomer prepared by a process comprising reacting an elastomer containing at least one reactive halogen atom with a poly($R_1$($R_2$)ethylene-co-maleimide) in the presence of a compatibilizer that reduces surface tension between the elastomer and the poly($R_1$($R_2$) ethylene-co-maleimide) and in the presence of a Lewis base catalyst, where $R_1$ is a monovalent organic group and $R_2$ is hydrogen or a monovalent organic group.

20 Claims, No Drawings

THERMOPLASTIC ELASTOMERS AND METHOD OF MAKING THE SAME

BACKGROUND OF THE INVENTION

Thermoplastic elastomers (TPEs) are well known. These materials combine the processing characteristics of thermoplastics with the physical properties of vulcanized rubbers, and they are therefore useful in many applications. TPEs are typically two-phase systems that include a hard thermoplastic phase that is coupled to a soft elastomeric phase, thus resulting in a material that exhibits the combined properties of the two phases.

Well known TPEs include styrene-butadiene-styrene and styrene-ethylene/butylene-styrene copolymers. In these polymers, the hard polystyrene domains are coupled to the soft, elastomeric butadiene or ethylene/butadiene domains. When subject to processing temperatures of roughly 102° C. and above, the polystyrene domains melt and the polymers are readily processable. Below the processing temperature, the polystyrene domains harden and the network is formed. These polymers are useful in coatings, membranes, extruded parts, and many other applications.

Notably, polystyrene domains typically have glass transition temperatures of about 100° C., and therefore TPEs made therewith are stable below this temperature. Above this temperature, however, the advantageous properties attributable to the polystyrene are diminished. Therefore, a need exists for TPEs having thermoplastic domains with higher glass transition temperatures.

SUMMARY OF THE INVENTION

In general the present invention provides a thermoplastic elastomer prepared by a process comprising reacting an elastomer containing at least one reactive halogen atom with a poly($R_1$($R_2$)ethylene-co-maleimide) in the presence of a compatibilizer that reduces surface tension between the elastomer and the poly($R_1$($R_2$)ethylene-co-maleimide) and in the presence of a Lewis base catalyst, where $R_1$ is a monovalent organic group and $R_2$ is hydrogen or a monovalent organic group.

The present invention also includes a thermoplastic elastomer produced by a process comprising the steps of in an internal mixer, mixing a poly($R_1$($R_2$) ethylene-co-maleimide) and a compatibilizer, where $R_1$ is a monovalent organic group and $R_2$ is a hydrogen or a monovalent organic group, charging to the mixer an elastomer having at least one reactive halogen atom, charging a catalyst to the mixer, and allowing the poly($R_1$($R_2$)ethylene-co-maleimide) and elastomer to react in the presence of the catalyst.

As end products, the method herein provides thermoplastic elastomer comprising a copolymer having at least one of each of the following [I], [II], and [III] units arranged in a block, statistical, or random configuration:

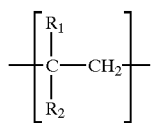

[I]

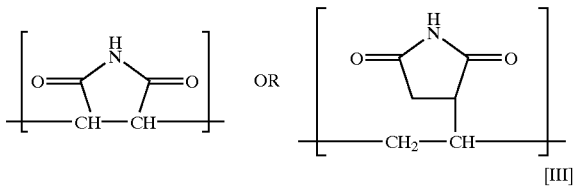

[II]

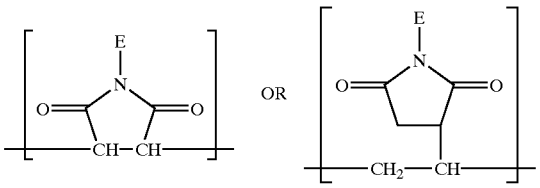

[III]

where $R_1$ is a monovalent organic group, $R_2$ is hydrogen or a monovalent organic group, and E is an elastomer.

The shortcomings of the prior art have advantageously been overcome by providing a TPE with thermoplastic domains that include maleimide units. As a result, these TPEs are stable at temperatures exceeding 160° C. Further, the synthesis of these TPEs has been facilitated by the discovery that a certain group of extenders, including propylene carbonate, allow soft, elastomeric polymers to be grafted to (co)polymers containing the maleimide units.

DETAILED DESCRIPTION OF ILLUSTRATIVE EMBODIMENTS

TPEs of this invention include soft domains that derive from an elastomeric polymer and hard domains that derive from copolymers containing maleimide units. The hard and soft domains are chemically bonded to one another.

The TPEs are prepared by reacting a copolymer containing maleimide units with an elastomeric polymer containing at least one reactive halogen. This reaction preferably takes place in the presence of a compatibilizer and a catalyst. In one embodiment, the compatibilizer is propylene carbonate and the reaction is catalyzed by an organic base.

The copolymer containing maleimide units is preferably a poly($R_1$($R_2$)ethylene-co-maleimide) which, includes random and stereo-specific copolymers, including copolymers having alternating $R_1$($R_2$)ethylene and maleimide monomer units along the polymer backbone. These molecules may be defined as poly($R_1$($R_2$)ethylene-alt-maleimide) or poly($R_1$($R_2$)ethylene-co-maleimide).

$R_1$ is a monovalent organic group, and $R_2$ may be either a hydrogen atom (H) or a monovalent organic group. Preferably, $R_1$ is selected from hydrocarbyl groups such as alkyl, substituted alkyl, cycloalkyl, substituted cycloalkyl, alkenyl, cycloalkenyl, substituted cycloalkenyl, aryl, substituted aryl, aralkyl, alkaryl, allyl, and alkynyl groups, with each group preferably containing from 1 carbon atom, or the appropriate minimum number of carbon atoms to form these groups, up to about 20 carbon atoms. These hydrocarbyl groups may contain heteroatoms, such as, but not limited to, N, O, Si, S, and P.

Examples of unsubstituted and substituted alkyl groups include methyl, ethyl, propyl, isopropyl, butyl, isobutyl, pentyl, isopentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, cyclopropyl, 2,2-dimethylcyclopropyl, cyclopentyl, cyclohexyl, methoxymethyl, methoxyethyl, methoxypropyl, methoxybutyl, methoxypentyl, methoxyhexyl, methoxyheptyl, methoxyoctyl, methoxynonyl, methoxydecyl, ethoxymethyl, ethoxyethyl, ethoxypropyl, ethoxybutyl, ethoxypentyl, ethoxyhexyl, ethoxyheptyl, ethoxyoctyl, ethoxynonyl, ethoxydecyl, propoxymethyl, propoxyethyl, propoxypropyl, propoxybutyl, propoxypentyl, propoxyhexyl, propoxyheptyl, propoxyoctyl, propoxynonyl, propoxydecyl, butoxybutoxymethyl, butoxyethyl, butoxypropyl, butoxybutyl, butoxypentyl, butoxyhexyl, butoxyheptyl, butoxyoctyl, butoxynonyl, butoxydecyl, pentyloxymethyl, pentyloxyethyl, pentyloxypropyl, pentyloxybutyl, pentyloxypentyl, pentyloxyhexyl, pentyloxyoctyl, pentyloxynonyl, pentyloxydecyl, hexyloxymethyl, hexyloxyethyl, hexyloxypropyl, hexyloxybutyl, hexyloxypentyl, hexyloxyhexyl, hexyloxyheptyl, hexyloxyoctyl, hexyloxynonyl, hexyloxydecyl, heptyloxymethyl, heptyloxyethyl, heptyloxypropyl, heptyloxybutyl, hexyloxypentyl, heptyloxyhexyl, heptyloxyheptyl, heptyloxyoctyl, heptyloxynonyl, heptyloxydecyl, octyloxymethyl, octyloxyethyl, octyloxypropyl, octyloxybutyl, octyloxypentyl, octyloxyhexyl, octyloxyheptyl, octyloxynonyl, octyloxyoctyl, decyloxymethyl, decyloxyethyl, decyloxypropyl, decyloxybutyl, decyloxypentyl, decyloxyhexyl, decyloxyheptyl, 1-methylethyl, 1-methylpropyl, 1-methylbutyl, 1-methylpentyl, 1-methylhexyl, 1-methylheptyl, 1-methyloctyl, 1-methylnonyl, 1-methyldecyl, 2-methylpropyl, 2-methylbutyl, 2-methylpentyl, 2-methylhexyl, 2-methylheptyl, 2-methyloctyl, 2,3-dimethylbutyl, 2,3,3-trimethylbutyl, 3-methylpentyl, 2,3-dimethylpentyl, 2,4-dimethylpentyl, 2,3,3,4-tetramethylpentyl, 3-methylhexyl, 2,5-dimethylhexyl and similar groups.

Specific examples of poly($R_1(R_2)$ethylene-co-maleimide) copolymers include poly(isobutylene-co-maleimide), poly(styrene-co-maleimide), poly($\alpha$-methylstyrene-co-maleimide), poly(octadecylene-co-maleimide), or mixtures thereof.

Poly($R_1(R_2)$ethylene-co-maleimide) is preferably formed by imidizing a poly($R_1(R_2)$ethylene-co-maleic anhydride) with an amine, where $R_1$ and $R_2$ are as defined above.

($R_1(R_2)$ethylene-co-maleic anhydride) polymers are prepared by reacting $R_1(R_2)$ethylene with maleic anhydride. Processes for forming ($R_1(R_2)$ethylene-co-maleic anhydride) are known. For example, preparing these copolymers from electron donor monomers, such as disubstituted ethylene, and electron acceptor monomers, such as maleic anhydride, by complexing the electron acceptor monomers may be carried out in the absence or presence of an organic free radical initiator in bulk, or in an inert hydrocarbon or halogenated hydrocarbon solvents such as benzene, toluene, hexane, carbon tetrachloride, chloroform, as disclosed in Gaylord et al., J. POLY. Sci., Part B, 7, 145 (1969) and MACROMOLECULES, 2, 442 (1969); and Takahashi et al., J MACROMOL. SCI. (Chemistry), A4, 127 (1970).

Copolymers of poly($R_1(R_2)$ethylene-co-maleic anhydride) are commercially available. For example, copolymers of poly(isobutylene-co-maleic anhydride) are commercially available under the tradename Isoban™ (Kuraray; Tokyo, Japan), and poly(styrene-co-maleic anhydride) is commercially available from Aldrich Chemicals.

The poly($R_1(R_2)$ethylene-co-maleic anhydride) can be reacted with any amine including those defined by the formula $HN(R)_2$ where each R is independently selected from hydrogen or monovalent organic groups such as defined above. Preferably, the amine is one or more of ammonia and a primary amine wherein the monovalent organic group is a simple alkyl group that includes from 1 to about 10 carbon atoms.

The poly($R_1(R_2)$ethylene-co-maleic anhydride) preferably contains from about 5 to about 99 mole percent of maleic anhydride contributed units with the remaining about 1 to about 95 mole percent being $R_1(R_2)$ethylene contributed units. The preferred ($R_1(R_2)$ethylene-co-maleic anhydride) copolymer contains from about 1 to about 50 mole percent maleic anhydride contributed units and about 99 to about 50 mole percent $R_1(R_2)$ethylene contributed units.

The poly($R_1(R_2)$ethylene-co-maleic anhydride) preferably has a weight average molecular weight of about 1,000 and up to about 500,000 or higher, but more typically between about 10,000 and 500,000, and even more typically between about 150,000 and 450,000, as measured by using GPC with polystyrene standards.

The reaction between the poly($R_1(R_2)$ethylene-co-maleic anhydride) and the amine is preferably carried out at a temperature from about 100° to about 300° C. and at a pressure from about 0.1 MPa to about 2.0 MPa, under substantially dry conditions. The reactants are preferably mixed in their solid state, i.e., dry mixed in the absence of solvents in a suitable mixing apparatus including an internal mixer such as a Brabender mixer or twin-screw extruder. The mixer is preferably purged with a non-reactive gas such as $N_2$ nitrogen prior to charging the reactants. The amine may be added in a single charge or in sequential partial charges into the reactor containing poly($R_1(R_2)$ethylene-co-maleic anhydride). Preferably the amine is charged in a ratio between 0.8 to 1.0 moles of amine per units derived from maleic anhydride in the poly($R_1(R_2)$ethylene-co-maleic anhydride).

Other methods include melt mixing, which includes mixing and dynamically heat-treating the components. Any conventional, generally known equipment, such as an open-type mixing roll, closed-type Banbury mixer, closed type Brabender mixer, extruding machine, kneader, continuous mixer, etc., is acceptable. The closed-type Brabender mixer is preferred, and mixing in an inactive gas environment, such as $N_2$ or Ar, is also preferred.

The elastomeric polymer containing at least one reactive halogen (halogenated elastomers) can include a multitude of elastomers that derive from the polymerization of halogenated monomers or by subsequently halogenating an elastomer.

Non-limiting examples of useful halogenated elastomers include brominated polyisobutylene, chlorinated polyisobutylene, chloroprene rubber, brominated natural rubber, brominated styrene-butadiene rubber, and mixtures thereof.

The elastomer containing a reactive halogen preferably has a degree of halogenation from about 0.1 to about 10% and preferably from about 0.1 to about 1.0%, where the percentage is based upon the weight percent of the halogen in view of the overall weight of the polymer.

Techniques for preparing halogenated elastomers are known including methods for halogenating existing elastomers and methods for polymerizing halogen-containing monomers.

Halogenated elastomers are commercially available from a number of sources. For example, brominated polyisobutylene is available under the tradename Bromobutyl 2222™ (Exxon Mobil; Houston, Tex.).

The compatibilizer serves as an extender for the poly(R$_1$(R$_2$)ethylene-co-maleimide) and halogenated elastomer reactants, and thereby eliminates or reduces phase separation or surface tension between the reactants. In general, the compatibilizer may include polar organic solvents or oils. Non-limiting examples of these compatibilizers include propylene carbonate, ethylene glycol, polyethylene glycol, diethyl phthalate, 12-crown-4 ether, and mixtures thereof. Propylene carbonate is preferred. These compatibilizers are readily available from a number of commercial sources.

A catalyst is preferably employed to promote the reaction between the poly(R$_1$(R$_2$)ethylene-co-maleimide) and the elastomer reactants. Useful catalysts are Lewis bases, preferably organic bases, that operate as proton or acid scavengers. Useful organic bases include imidazoles such as 2-ethyl-4-methyl-imidazole, 4-methyl-imidazole, and imidazole. These organic bases are readily available from a number of commercial sources.

Generally, from about 1 to about 99 parts by weight (pbw) halogenated elastomer is reacted with from about 99 to about 1 pbw poly(R$_1$(R$_2$)ethylene-co-maleimide) to total about 100 pbw. Preferably, from about 10 to about 90 pbw halogenated elastomer, and even more preferably from about 30 to about 70 pbw halogenated elastomer, is reacted with from about 10 to about 90, and even more preferably from about 70 to about 30 pbw, poly(R$_1$(R$_2$)ethylene-co-maleimide) to total about 100 pbw. As the ratio of the poly(R$_1$(R$_2$)ethylene-co-maleimide) to the elastomeric polymer increases, the TPE will tend to have properties of high modulus and high hardness, i.e., it will be more plastic. As the ratio of the poly(R$_1$(R$_2$)ethylene-co-maleimide) to the elastomeric polymer decreases, the TPE will tend to have properties of low modulus and low hardness, i.e., more elastomeric. Therefore, where rubber-type materials are desired, such as for gaskets and similar articles, a higher ratio of elastomeric polymer to poly(R$_1$(R$_2$)ethylene-co-maleimide) can be employed. Where harder materials are desired, such as for automobile bumpers or plastic-like containers, a higher poly(R$_1$(R$_2$)ethylene-co-maleimide) to elastomeric polymer ratio can be employed.

The reaction between the halogenated elastomer and poly(R$_1$(R$_2$)ethylene-co-maleimide) generally takes place in the presence of about 0.1 to about 35 pbw compatibilizer per 100 pbw poly(R$_1$(R$_2$)ethylene-co-maleimide) and halogenated elastomers combined. Preferably, the reaction takes place in the presence of about 1 to about 10, and more preferably from about 1 to about 5, pbw compatibilizer per 100 pbw poly(R$_1$(R$_2$)ethylene-co-maleimide) and halogenated elastomer combined.

Also, the reaction generally takes place in the presence of about 0.01 to about 15 pbw catalyst per 100 pbw poly(R$_1$(R$_2$)ethylene-co-maleimide) and halogenated elastomer combined. Preferably, the reaction takes place in the presence of about 0.1 to about 10 pbw, and more preferably from about 0.1 to about 10 pbw, catalyst per 100 pbw poly(R$_1$(R$_2$)ethylene-co-maleimide) and halogenated elastomer combined.

The resulting TPE includes at least one of each of the following units [I], [II], and [III], arranged in a block, statistical, or random copolymer configuration:

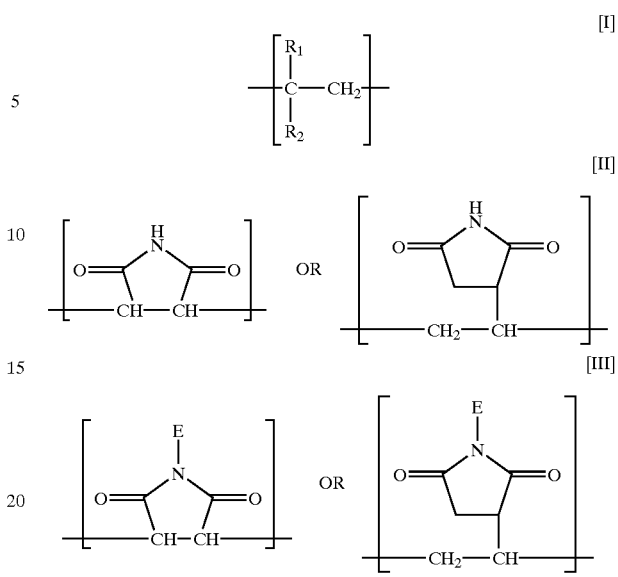

where R$_1$ and R$_2$ are as defined above, and E is an elastomer.

The TPE generally includes from about 1 to about 99 mole % of units defined by I, from about 1 to about 99 mole % of units defined by II, and from about 0.01 to about 10 mole % of units defined by III. Preferably, the TPE will include from about 10 to about 80 mole % of units defined by the I, from about 20 to about 70 mole % of units defined by II, and from about 1 to about 10 mole % of units defined by the III.

The TPEs can be added to rubber compositions that are useful for making tire inner liners. In general, these rubber compositions will include from about 1 to about 99 pbw of the TPE per 100 pbw rubber within the rubber composition. Other uses include barrier materials such as tank inner liners, sealing materials such as gaskets and moldings, hoses including those for oils or refrigerant fluids, and gloves.

To demonstrate the practice of this invention, the following examples were prepared and tested. The examples should not, however, be viewed as limiting the scope of the present invention.

EXAMPLES

Example 1

Control

A charge of 9 g Isoban™ 306 poly(isobutylene-co-maleimide) (Kuraray) and 4 g propylene carbonate (Aldrich) was added to a nitrogen purged Brabender mixer (about 55 g capacity) equipped with a roller blade. The mixer was initially set to 120° C. and 60 rpm. The mixer ran under these conditions for 5 minutes, and, thereafter, 36 g Bromobutyl 2222™ bromide polyisobutylene (Exxon Mobil), which was characterized by 2.0% bromine and a Mooney viscosity (ML$_{1+4}$ @ 100° C.) of 32, was charged to the mixer. No catalyst was added to the mixer. The mixture was further mixed for 45 minutes at the same temperature and same mixing rate. Agitation was halted, and the product removed from the mixer.

Example 2

The procedure in Example 1 was repeated; however, 1 g of 2-ethyl-4-methyl imidazole (Aldrich) was added to the mixer immediately after the bromide polyisobutylene. After addition of the catalyst, reaction between thermoplastic and elastomeric components was evidenced by an increase in mixing torque.

Example 3

The procedure of Example 1 was repeated; however, 0.6 g of 2-ethyl-4-methyl imidazole was added to the mixer 4 minutes after the addition of the bromide polyisobutylene. Additionally, after charging the catalyst, the mixture was mixed for 25 minutes at 120° C., and mixing continued for an additional 40 minutes.

Example 4

The procedure of Example 2 was repeated; however, only 0.3 g of 2-ethyl-4-methyl imidazole was added.

The products of Examples 1–4 were molded into sheets and cylinder buttons at approximately 160° C. Ring samples were cut from these sheets for tensile measurements. The tensile properties were determined according to ASTM D-412 at 23° C. by using an Instron™ testing machine. Compression set was determined at 100° C. compression according to ASTM D-395. Shore hardness was determined according to ASTM D-2240. The physical properties of the final materials are provided in Table 1.

TABLE 1

|  | 1 | 2 | 3 | 4 |
|---|---|---|---|---|
| Tensile at Break (MPa) | 0.31 | 1.28 | 0.93 | 0.29 |
| Elongation at Break (%) | 58 | 154 | 204 | 158 |
| Shore A Hardness | 50 | 52 | 54 | 53 |
| Compression Set (%) | Flowed | 51.2 | 44.7 | 48.4 |

The products of Examples 2–4 were TPEs that could be recycled at a temperature at or above 160° C.

Various modifications and alterations that do not depart from the scope and spirit of this invention will become apparent to those skilled in the art. This invention is not to be duly limited to the illustrative embodiments set forth herein.

What is claimed is:

1. A thermoplastic elastomer prepared by a process comprising:
   reacting an elastomer containing at least one reactive halogen atom with a poly($R_1(R_2)$ethylene-co-maleimide) in the presence of a compatibilizer that reduces surface tension between the elastomer and the poly($R_1(R_2)$ethylene-co-maleimide) and in the presence of a Lewis base catalyst, where $R_1$ is a monovalent organic group and $R_2$ is hydrogen or a monovalent organic group.

2. The thermoplastic elastomer of claim 1, where said step of reacting takes place at a temperature of from about 100° to about 300° C. and a pressure from about 0.1 MPa to about 2.0 MPa.

3. The thermoplastic elastomer of claim 1, where said step of reacting takes place in the absence of solvents within an internal mixer.

4. The thermoplastic elastomer of claim 1, where from about 1 to about 99 parts by weight of the elastomer containing at least one reactive halogen atom is reacted with from about 99 to about 1 parts by weight of the poly($R_1(R_2)$ethylene-co-maleimide) to total about 100 parts by weight.

5. The thermoplastic elastomer of claim 1, where said step of reacting takes place in the presence of about 0.1 to about 35 parts by weight of the compatibilizer per 100 parts by weight of the elastomer and poly($R_1(R_2)$ethylene-co-maleimide) combined.

6. The thermoplastic elastomer of claim 1, where said step of reacting takes place in the presence of about 0.01 to about 15 parts by weight of the catalyst per 100 parts by weight of the elastomer and poly($R_1(R_2)$ethylene-co-maleimide) combined.

7. The thermoplastic elastomer of claim 1, where the elastomer containing at least one reactive halogen comprises at least one of brominated polyisobutylene, chlorinated polyisobutylene, chloroprene rubber, brominated natural rubber, and brominated styrene-butadiene rubber.

8. The thermoplastic elastomer of claim 1, where the poly($R_1(R_2)$ethylene-co-maleimide) comprises at least one of poly(isobutylene-co-maleimide), poly(styrene-co-maleimide), poly($\alpha$-methylstyrene-co-maleimide), and poly(octadecylene-co-maleimide).

9. The thermoplastic elastomer of claim 1, where the compatibilizer comprises at least one of propylene carbonate, ethylene glycol, polyethylene glycol, diethyl phthalate, and 12-crown-4 ether.

10. The thermoplastic elastomer of claim 1, where the compatibilizer comprises propylene carbonate.

11. The thermoplastic elastomer of claim 1, where the catalyst comprises an imidazole.

12. The thermoplastic elastomer of claim 11, where the imidazole comprises 2-ethyl-4-methyl-imidazole.

13. A tire comprising an inner liner comprising the thermoplastic elastomer of claim 1.

14. A thermoplastic elastomer produced by a process comprising the steps of:
   in an internal mixer, mixing a poly($R_1(R_2)$ethylene-co-maleimide) and a compatibilizer, where $R_1$ is a monovalent organic group and $R_2$ is a hydrogen or a monovalent organic group;
   charging to the mixer an elastomer having at least one reactive halogen atom;
   charging a catalyst to the mixer; and
   allowing the poly($R_1(R_2)$ethylene-co-maleimide) and elastomer to react in the presence of the catalyst.

15. The thermoplastic elastomer of claim 14, where the compatibilizer reduces surface tension between the poly($R_1(R_2)$ethylene-co-maleimide) and the elastomer.

16. The thermoplastic elastomer of claim 14, where the compatibilizer comprises propylene carbonate and the catalyst comprises 2-ethyl-t-methyl-imidazole.

17. The thermoplastic elastomer of claim 14, where the poly($R_1(R_2)$ethylene-co-maleimide) comprises at least one of poly(isobutylene-co-maleimide), poly(styrene-co-maleimide), poly($\alpha$-methylstyrene-co-maleimide), and poly(octadecylene-co-maleimide).

18. The thermoplastic elastomer of claim 14, where the elastomer comprises at least one of brominated polyisobutylene, chlorinated polyisobutylene, chloroprene rubber, brominated natural rubber, and brominated styrene-butadiene rubber.

19. A thermoplastic elastomer comprising:
   a copolymer having at least one of each of the following [I], [II], and [III] units arranged in a block, statistical, or random configuration:

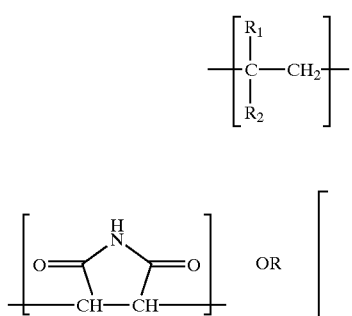
[I]
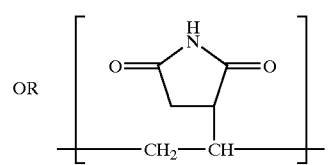
[II]
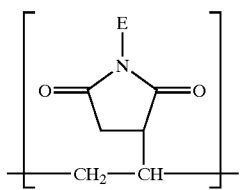
[III]
where $R_1$ is a monovalent organic group, $R_2$ is hydrogen or a monovalent organic group, and E is an elastomer.
20. A tire comprising an inner liner comprising the thermoplastic elastomer of claim 19.
* * * * *